(12) United States Patent
Cho et al.

(10) Patent No.: US 9,123,497 B2
(45) Date of Patent: Sep. 1, 2015

(54) COLOR FILTER SUBSTRATE FOR DISPLAY DEVICE INTEGRATED WITH TOUCH SCREEN AND METHOD FOR FABRICATING THE SAME

(71) Applicant: LG DISPLAY CO., LTD., Seoul (KR)

(72) Inventors: Sung-Yong Cho, Seoul (KR); So-Hyung Lee, Goyang-si (KR); Jae-Gyun Lee, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 109 days.

(21) Appl. No.: 14/144,151

(22) Filed: Dec. 30, 2013

(65) Prior Publication Data
US 2014/0313435 A1  Oct. 23, 2014

(30) Foreign Application Priority Data

Apr. 22, 2013 (KR) .......................... 10-2013-0044264

(51) Int. Cl.
| | |
|---|---|
| G02F 1/1335 | (2006.01) |
| G02F 1/1333 | (2006.01) |
| H01J 9/20 | (2006.01) |
| G06F 3/041 | (2006.01) |
| G06F 3/044 | (2006.01) |

(52) U.S. Cl.
CPC . *H01J 9/20* (2013.01); *G06F 3/044* (2013.01); *G06F 3/0412* (2013.01); *G06F 2203/04111* (2013.01); *G06F 2203/04112* (2013.01)

(58) Field of Classification Search
CPC .......... G02F 1/13338; G02F 1/133512; G02F 2001/13312; G02F 1/133516; G02F 1/1333; G02F 1/133305; G02F 1/133351; G06F 3/0412; G06F 3/045; G06F 3/044
USPC ............................................ 349/12, 106, 158
See application file for complete search history.

(56) References Cited

U.S. PATENT DOCUMENTS

| | | | |
|---|---|---|---|
| 2010/0182275 A1* | 7/2010 | Saitou ............................. | 257/59 |
| 2011/0169000 A1* | 7/2011 | Bang et al. .................... | 345/174 |
| 2013/0044384 A1* | 2/2013 | Kim et al. ..................... | 359/885 |

FOREIGN PATENT DOCUMENTS

| | | |
|---|---|---|
| JP | 2010-72564 A | 4/2010 |
| JP | 2010-170163 A | 8/2010 |
| JP | 2013-45100 A | 3/2013 |
| WO | WO 2013/157532 A1 | 10/2013 |

* cited by examiner

*Primary Examiner* — Mike Qi
(74) *Attorney, Agent, or Firm* — Birch, Stewart, Kolasch & Birch, LLP

(57) ABSTRACT

A color filter substrate for a display device includes a first protection layer on a plurality of touch sensing electrodes and touch driving electrode arrays; a bridge on the first protection layer and connecting the plurality of touch sensing electrodes; a second protection layer on the bridge; a black matrix on the second protection layer; a color filter layer on the black matrix, wherein the plurality of touch sensing electrodes include a first mesh pattern formed by crossing of first metal lines, the plurality of touch driving electrode arrays include a plurality of second mesh patterns formed by crossing of second metal lines, wherein the black matrix is formed at regions corresponding to the first and second metal lines, and wherein a line width of the black matrix is equal to or greater than each of the metal lines forming the first and second mesh patterns.

8 Claims, 9 Drawing Sheets

COLOR FILTER SUBSTRATE FOR DISPLAY DEVICE INTEGRATED WITH TOUCH SCREEN AND METHOD FOR FABRICATING THE SAME

The present invention claims the benefit of Korean Patent Application No. 10-2013-0044264, filed in Korea on Apr. 22, 2013, which is hereby incorporated by reference for all purposes as if fully set forth herein.

BACKGROUND OF THE INVENTION

1. Field of the Invention

The present invention relates to a display device integrated with touch screen, and more particularly, to a color filter substrate for a display device integrated with touch screen.

2. Discussion of the Background Art

There is a display device where electrodes are alternately arranged at one of upper and lower substrates and a liquid crystal is between the substrates thereby display images, and particularly, there is a display device integrated with touch screen in which touch electrodes are built.

The touch screen-integrated display device integrated with touch screen is fabricated by attaching a color filter substrate having a color filter array and a TFT (thin film transistor) substrate having a thin film transistor array with a liquid crystal therebetween, and displays images by adjusting light transmittance of liquid crystal that has dielectric anisotropy.

The TFT substrate includes a TFT, a pixel electrode and a common electrode in each cell region that is defined by crossing of gate and data lines on a substrate, and the color filter substrate includes a black matrix blocking light leakage, and red, green and blue color filters with black matrix thereamong.

The touch screen-integrated display device according to the prior art is operated in a display driving mode or touch driving mode with a time division method. That is, when the driving mode of the display device is the display driving mode, the pixel electrode of the TFT substrate is supplied with a data signal, and the common electrode is supplied with a common voltage that is as a reference voltage when operating the liquid crystal, thus the liquid crystal is rotated and adjusts light transmittance according to an electric field produced by the data signal of the pixel electrode and the common voltage of the common electrode, and thus gray level is realized. When the driving mode of the display device is the touch driving mode, the pixel electrode or the common electrode is divided and utilized as a touch electrode, and thus touch position by user's input is sensed.

However, since the touch electrode is formed by diving the pixel electrode or common electrode at the TFT substrate in the prior touch screen-integrated display device, circuit design is difficult, and achieving large size is difficult because of increase of time constant.

SUMMARY OF THE INVENTION

Accordingly, the present invention is directed to a color filter substrate for a touch screen-integrated display device and a method of fabricating the same which substantially obviates one or more of the problems due to limitations and disadvantages of the prior art.

An advantage of the present invention is to provide a color filter substrate for a touch screen-integrated display device and a method of fabricating the same that can achieve simple circuit design of touch electrode and large size.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

To achieve these and other advantages and in accordance with the purpose of the present invention, as embodied and broadly described herein, a color filter substrate for a display device integrated with a touch screen includes a plurality of touch sensing electrodes and a plurality of touch driving electrode arrays on a substrate; a first protection layer on the plurality of touch sensing electrodes, the plurality of touch driving electrode arrays and the substrate; a bridge formed on the first protection layer and connecting the plurality of touch sensing electrodes to one another; a second protection layer on the first protection layer and the bridge; a black matrix on the second protection layer; a color filter layer on the second protection layer and the black matrix; and a third protection layer on the color filter layer, wherein the plurality of touch sensing electrodes include a first mesh pattern formed by crossing of first metal lines, and the plurality of touch driving electrode arrays include a plurality of second mesh patterns formed by crossing of second metal lines, wherein the black matrix is formed at regions corresponding to the first and second metal lines, wherein a line width of the black matrix is equal to or greater than each of the metal lines forming the first and second mesh patterns.

In another aspect, a method of fabricating a color filter substrate for a display device integrated with a touch screen includes forming a plurality of touch sensing electrodes and a plurality of touch driving electrode arrays on a substrate; forming a first protection layer on the plurality of touch sensing electrodes, the plurality of touch driving electrode arrays and the substrate; forming a bridge that is on the first protection layer and connects the plurality of touch sensing electrodes to one another; forming a second protection layer on the first protection layer and the bridge; forming a black matrix on the second protection layer; forming a color filter layer on the second protection layer and the black matrix; and forming a third protection layer on the color filter layer, wherein the plurality of touch sensing electrodes include a first mesh pattern formed by crossing of first metal lines, and the plurality of touch driving electrode arrays include a plurality of second mesh patterns formed by crossing of second metal lines, wherein the black matrix is formed at regions corresponding to the first and second metal lines, and wherein a line width of the black matrix is equal to or greater than each of the metal lines forming the first and second mesh patterns.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

In the explanations below, an expression of a component formed on another component means either a case that the two components contact each other, or a case that yet another component is interposed between the two components.

Moreover, a color filter substrate of an embodiment of the present invention and a TFT substrate are attached to each other with a liquid crystal therebetween thereby fabricating a touch screen-integrated display device, a process of fabricating the TFT substrate and a process of attaching the substrates may be conventional and omitted in this description.

A color filter substrate for a touch screen-integrated display device and a method of fabricating the same are explained in detail with reference to FIGS. 1 to 9.

Figure 1:
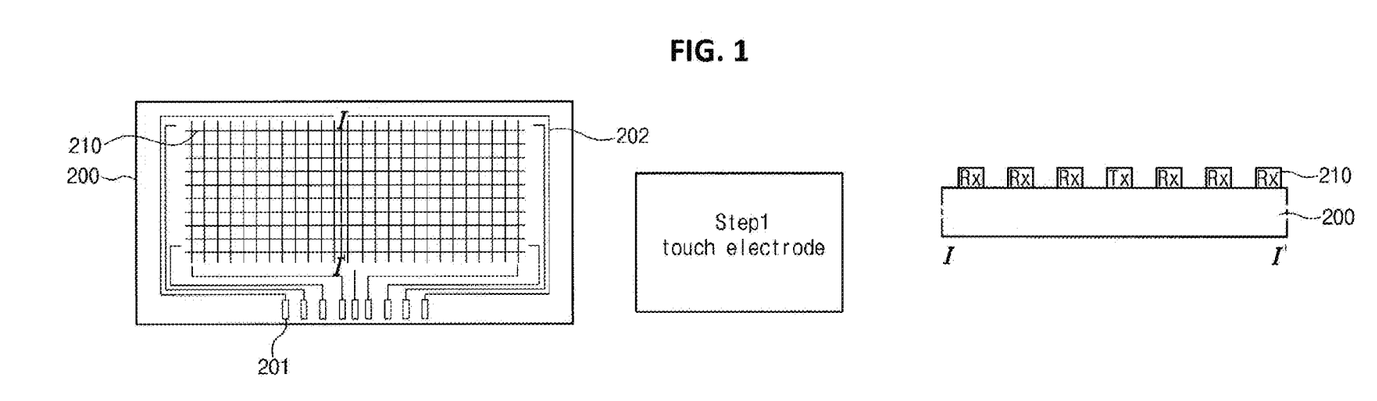
FIGS. 1 to 9 are cross-sectional views illustrating a color filter substrate for a touch screen-integrated display device according to an embodiment of the present invention.

For reference, right drawings of FIGS. 1 to 9 are cross-sectional taken along a line I-I' of a left drawing of FIG. 1

Regarding the method of fabricating the color filter substrate for the touch screen-integrated display device, a plurality of touch electrodes 210 are formed on the color filter substrate 200.

The plurality of touch electrodes 200 are divided into a plurality of touch sensing electrode arrays and a plurality of touch driving electrode arrays, and a plurality of touch sensing electrodes are connected to one another through a bridge to form a plurality of touch sensing electrode arrays.

When a driving pulse is applied to the plurality of touch driving electrode arrays Tx from a touch driving portion, based on change of capacitance producing between the touch driving electrode array Tx and the touch sensing electrode array Rx, change of capacitance by user's touch is transferred to a touch sensing portion through the plurality of touch sensing electrodes arrays Rx, and the touch sensing portion performs function of sensing user's touch position.

The touch driving portion and the touch sensing portion are connected to the plurality of touch electrodes through a routing line 201 and a connection line 202.

The plurality of touch sensing electrodes includes a first mesh pattern that is formed by crossing of first metal lines, and the plurality of touch driving electrode arrays include a plurality of second mesh patterns that are formed by crossing of second metal lines.

That is, when one Rx of FIG. 1 is one first metal line, three first metal lines on the left of the Tx are connected to one another and are a part of one first mesh pattern, and three first metal lines on the right of the Tx are connected to one another and are a part of one first mesh pattern. Moreover, since the Tx of FIG. 1 is a connection portion through which the plurality of touch driving electrodes forms the touch driving electrode array, it may be shown as only one Tx.

The touch electrode of the mesh pattern shape is explained with reference to FIGS. 10 and 11 later.

The first and second metal lines may be selected out of metal materials, such as Al, AlNd, Mo, MoTi, Cu, Cr, Ag and Ag series alloys. By using such the metal of excellent conductivity as a material of the touch electrode, time constant is reduced due to low resistance, and thus there is advantage that a large-sized touch screen-integrated display device can be fabricated.

Figure 2:
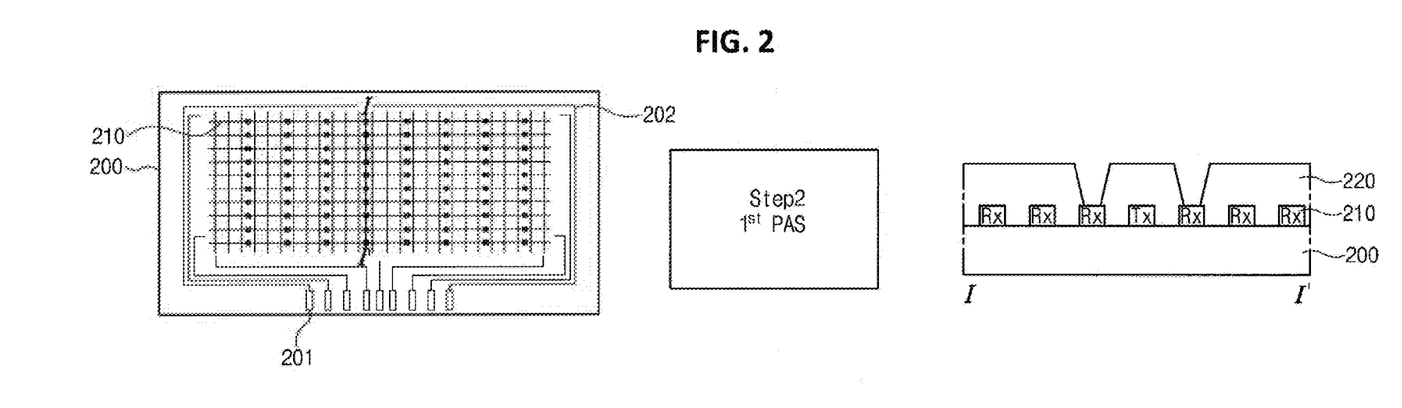

Then, as shown in FIG. 2, a first protection layer 220 is formed on the plurality of touch sensing electrodes Rx, the plurality of touch driving electrode arrays and the substrate 200. That is, the first protection layer 220 is formed to have a contact hole that exposes one first metal line forming the touch sensing electrode Rx, and one touch contact hole may be formed for one touch sensing electrode. The first protection layer may be formed as a passivation layer.

Figure 3:
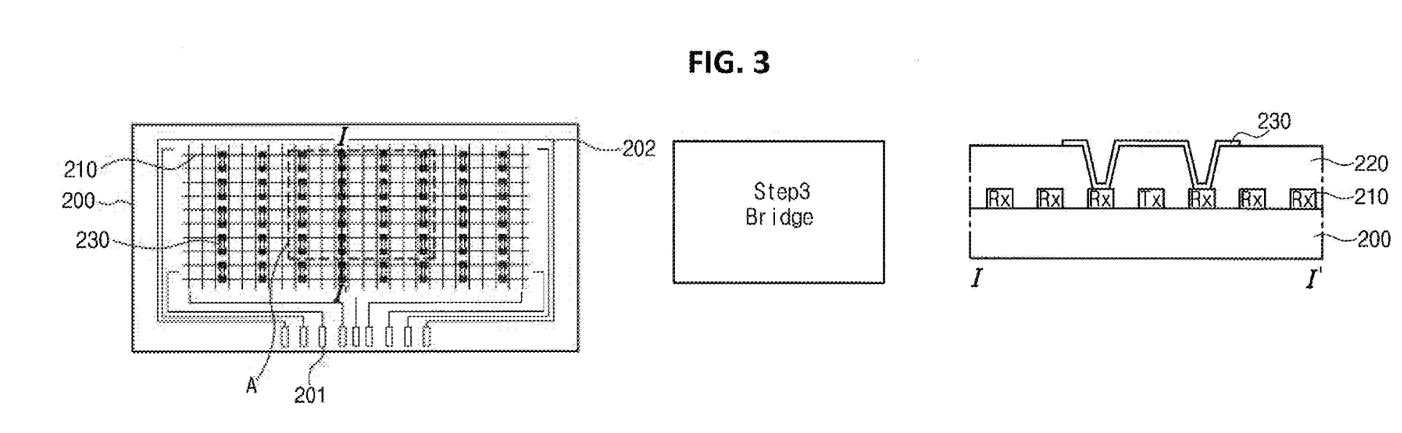

Then, as shown in FIG. 3, bridges 230 are formed on the first protection layer 220, and connect the plurality of touch sensing electrodes. That is, the bridge 230 connecting the neighboring touch sensing electrodes is formed on the first protection layer 220. The bridge 230 connects the neighboring touch sensing electrodes through the contact holes exposing the first metal lines forming the touch sensing electrodes Rx, and thus the touch sensing electrodes form the touch sensing electrode array.

Figure 4:
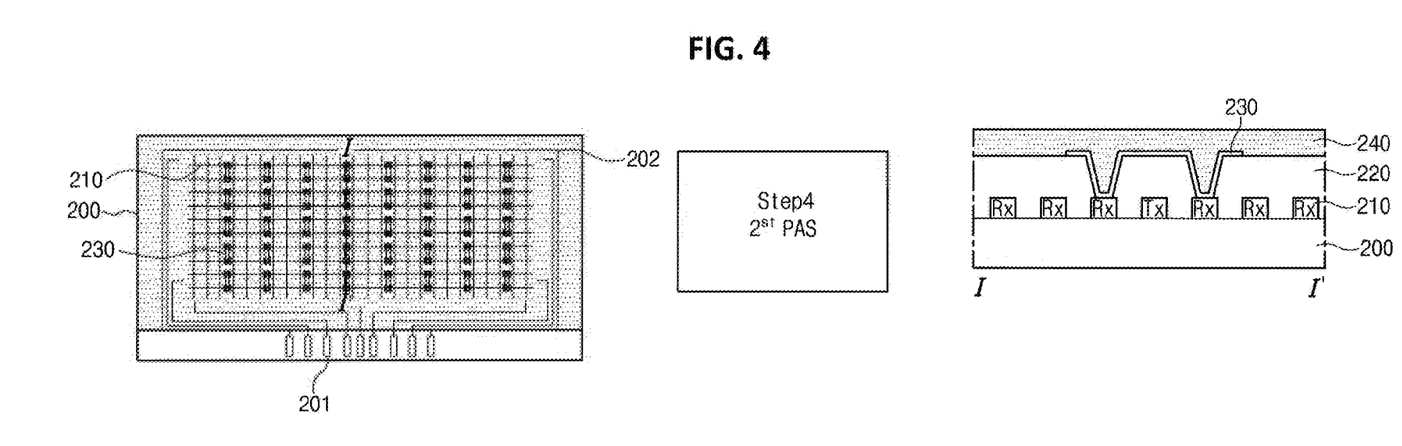

Then, as shown in FIG. 4, a second protection layer 240 is formed on the first protection layer 220 and the bridge 230. The second protection layer 240 may be formed as a passivation layer.

Figure 5:
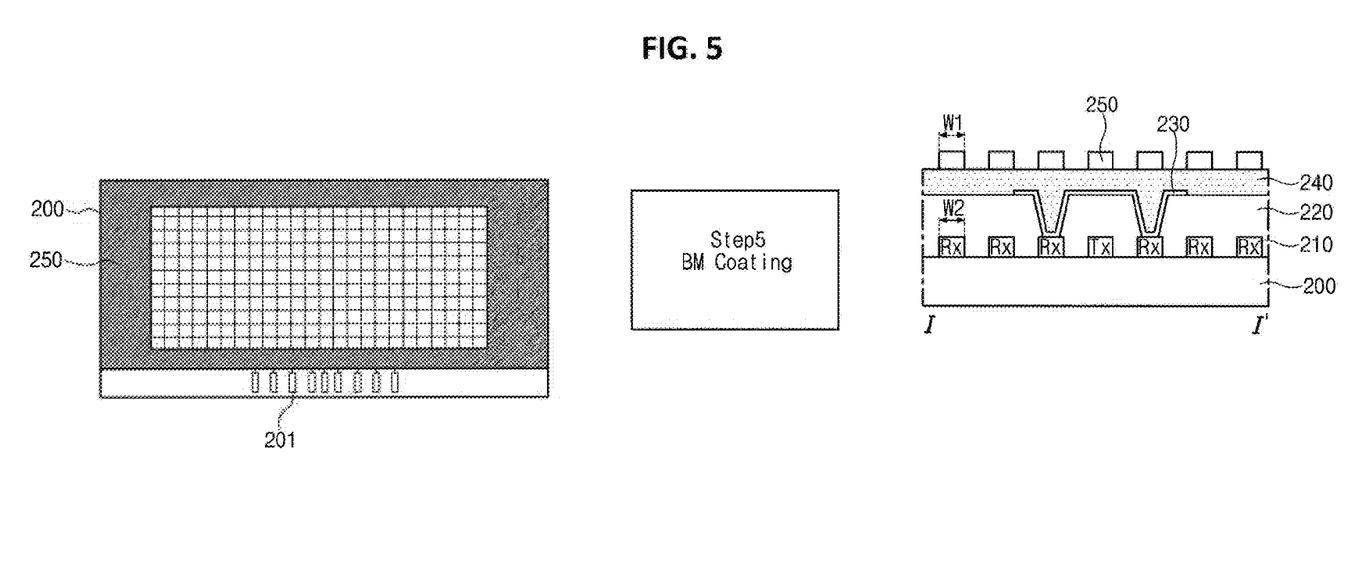

Then, as shown in FIG. 5, a black matrix 250 is formed on the second protection layer 240. The black matrix 250 is formed by patterning resin near boundary among red, green and blue color pigments, and makes light of a pixel transmissive region pass. Further, the black matrix 250 blocks unintended light transmission and thus there is an advantage of CR improvement.

The black matrix 250 of the color filter substrate for the touch screen-integrated display device of the embodiment is formed at regions corresponding to the first metal lines that form the plurality of touch sensing electrodes, and at regions corresponding to the second metal lines that form the plurality of touch driving electrode arrays.

That is, by forming the touch electrode at the region corresponding to the black matrix 250, the touch electrode region is shielded by the black matrix, and thus visibility can be increased and high transmittance and brightness can be obtained. Further, without optical loss due to formation of the touch electrode, the touch electrode can be formed.

In addition, in order that the black matrix 250 shields the touch electrode more clearly, a line width W1 of the black matrix 250 may be equal to or greater than a line width W2 of each metal line forming the first and second mesh patterns. That is, the line width W2 of each metal line forming the first and second mesh patterns may be equal to or less than the line width W1 of the black matrix 250.

Figure 6:
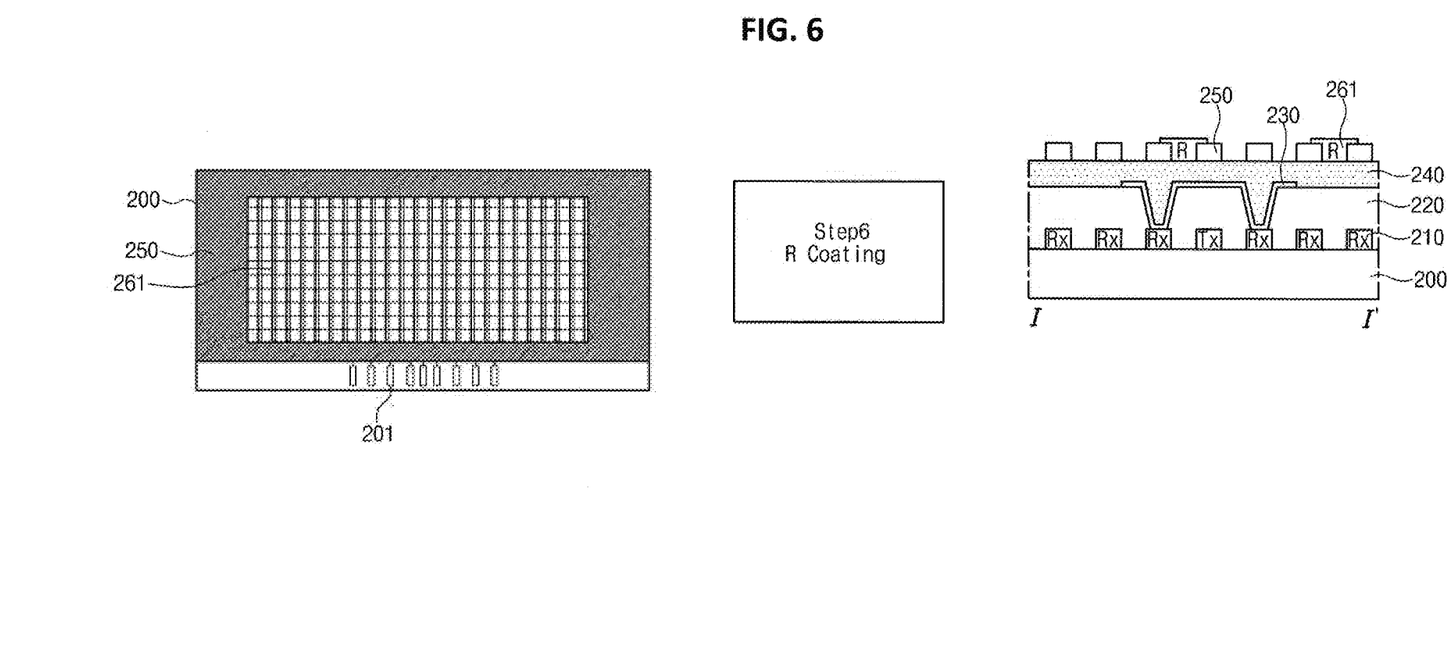
Figure 7:
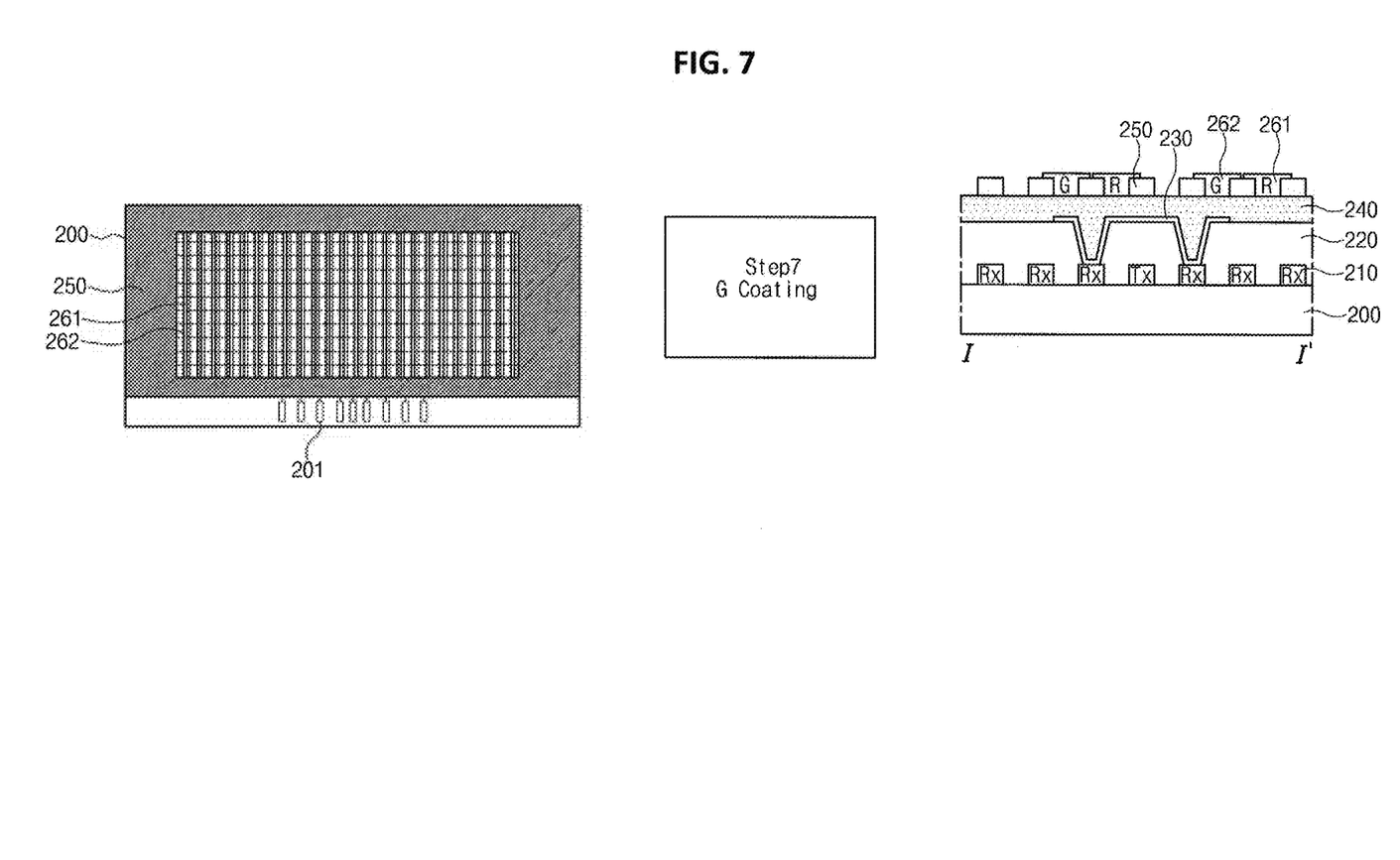
Figure 8:
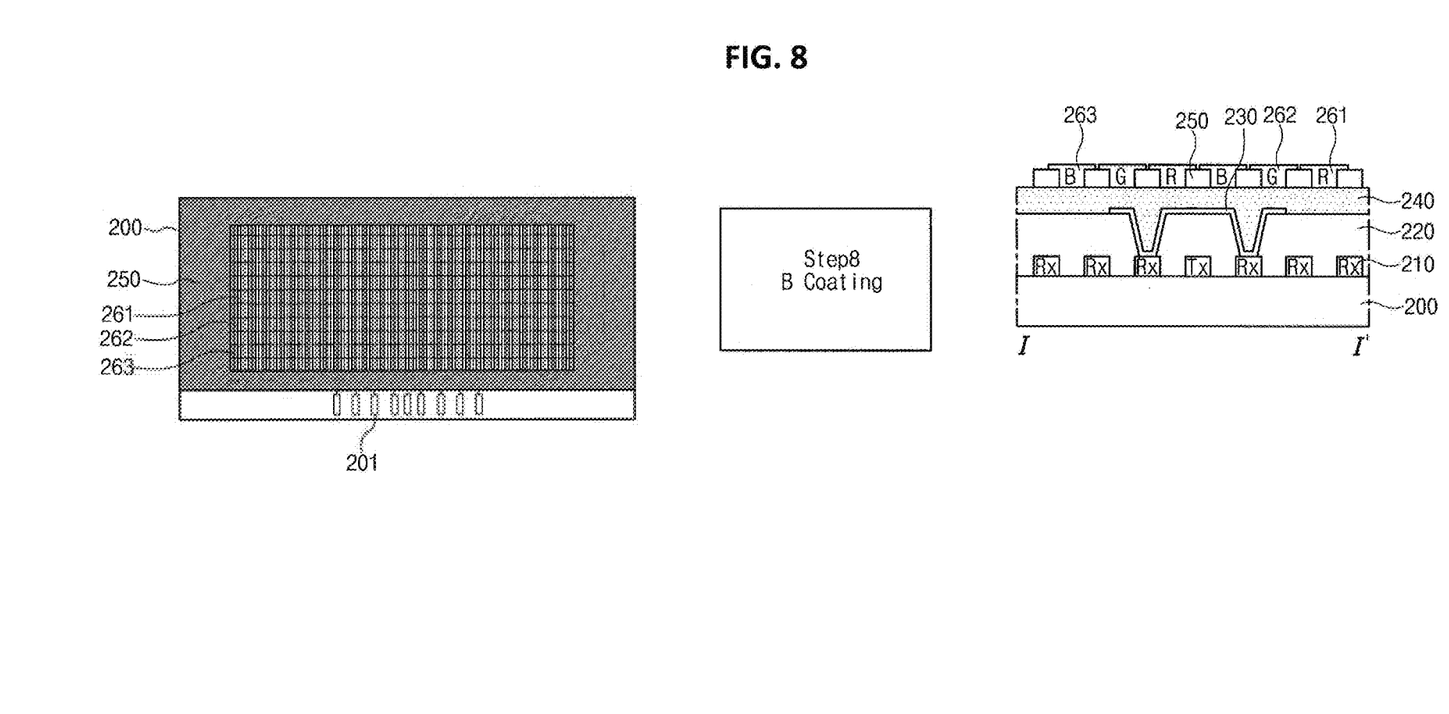

Then, as shown in FIGS. 6 to 8, red (R), green (G) and blue (B) color filter layers 261, 262 and 263 are formed on the second protection layer 240 and the black matrix 250.

The color filter layers 261 to 263 are filter layers separating white light emitted from a backlight into red, green and blue lights, are patterned with pigments transmitting specific wavelengths of the white light from the backlight, and correspond to respective sub pixels of the TFT substrate.

Figure 9:
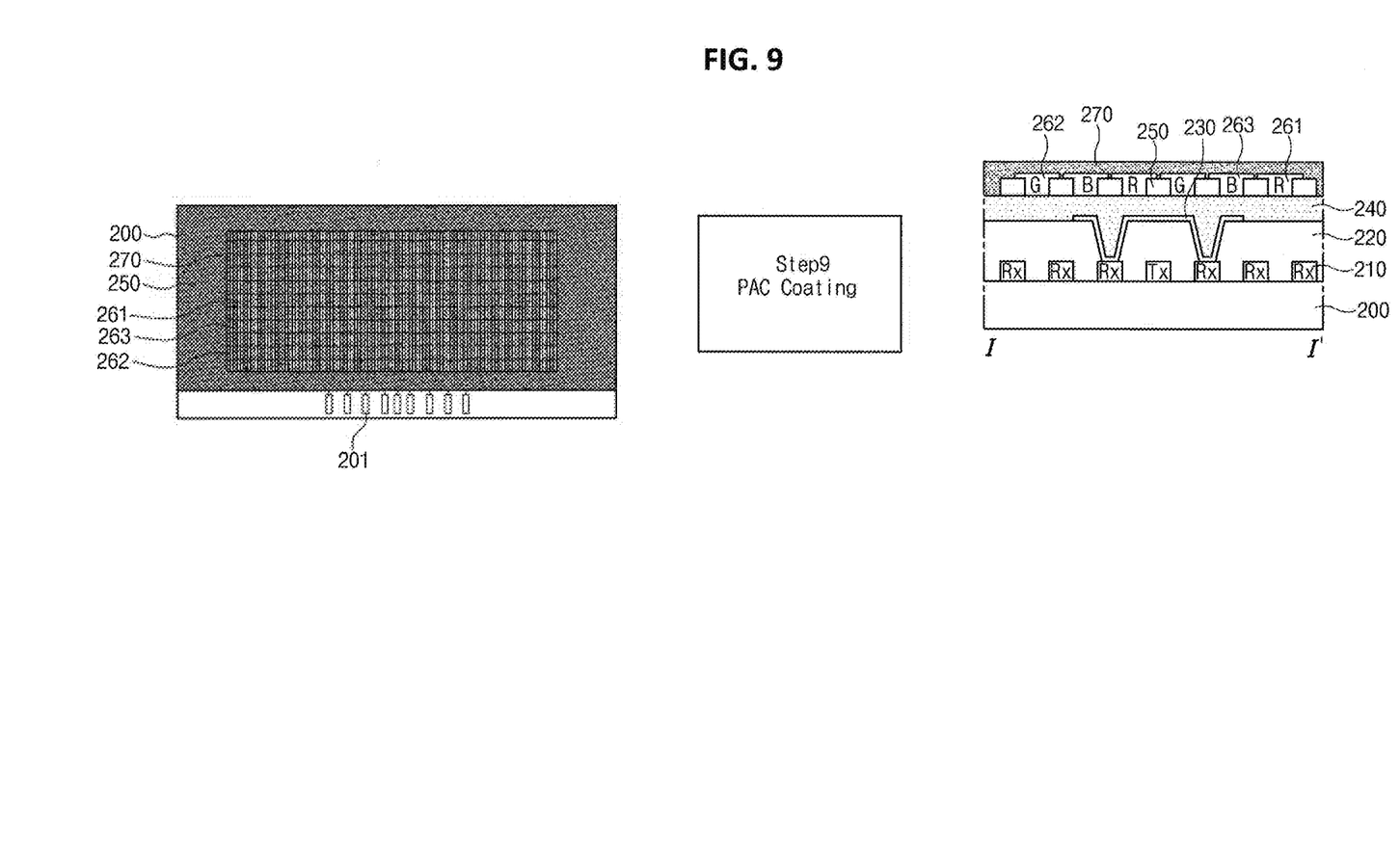

Then, as shown in FIG. 9, a third protection layer 270 is formed on the color filter layers 261 to 263. The third protection layer 270 may be formed as a photo acryl layer or overcoat layer. The photo acryl functions as a photoresist (PR) and an insulating film. A height step after forming the color filter layers 261 to 263 may influence a thickness of a column spacer, and to prevent this, the overcoat layer functions to relieve the height step.

The shape of the touch electrode of the color filter substrate for the touch screen-integrated display device of the embodiment is explained in detail with reference to FIGS. 10 and 11.

Figure 10:
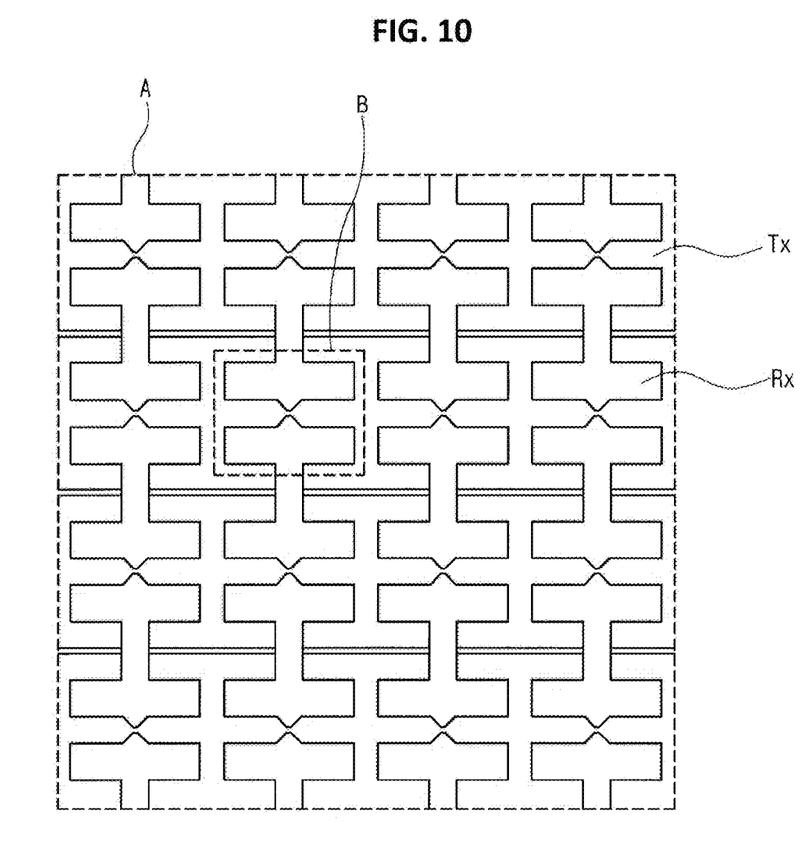
FIG. 10 is a view enlarging a region A of FIG. 3.
Figure 11:
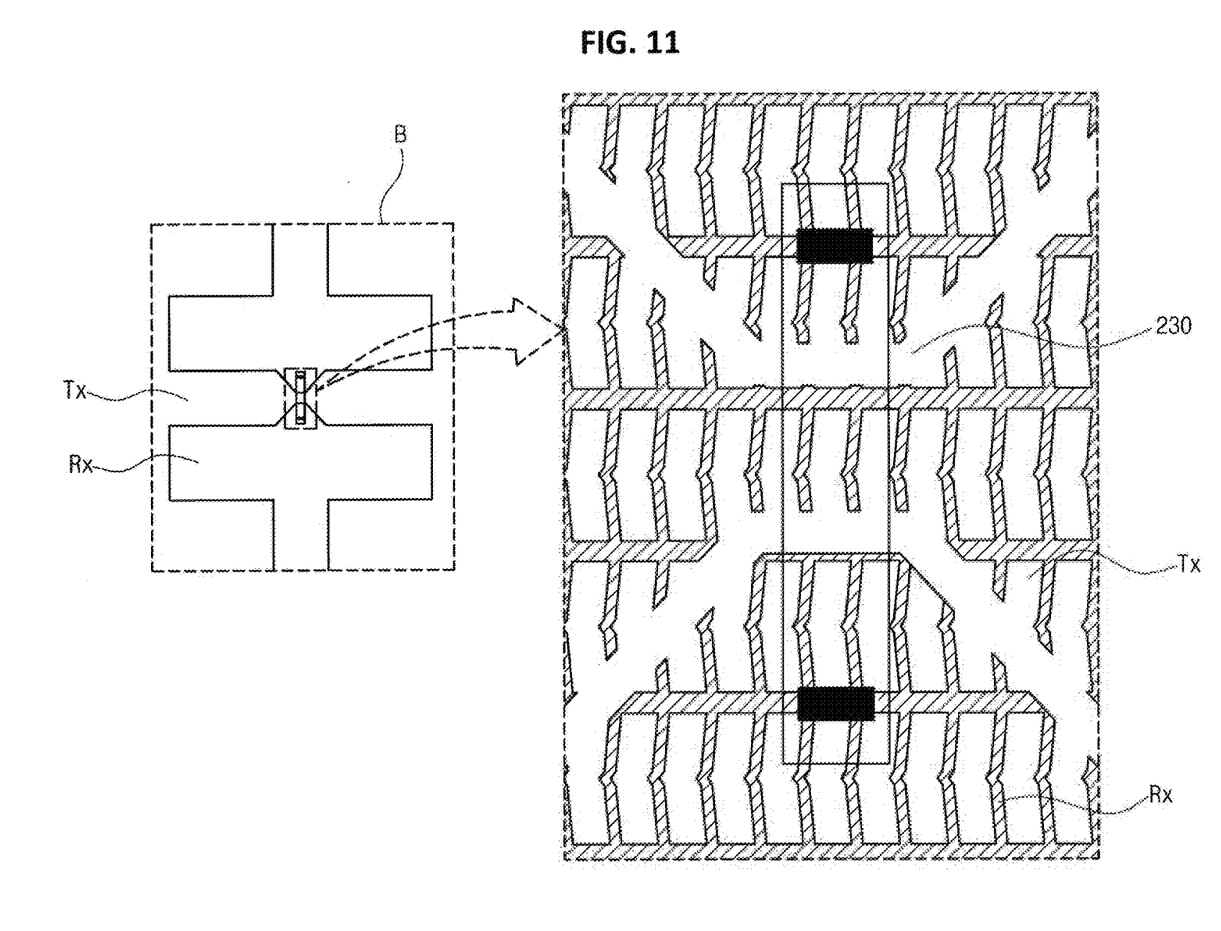
FIG. 11 is a view enlarging a region B of FIG. 10.

FIG. 10 is a view enlarging a region A of FIG. 3 that shows the electrode of a mesh shape of the color filter substrate for the touch screen-integrated display device of the embodiment, and FIG. 11 is a view enlarging a region B of FIG. 10.

As shown in FIG. 10, the touch electrodes are divided into the plurality of touch sensing electrode arrays Rx and the plurality of touch driving electrode arrays Tx. The plurality of touch sensing electrode array Rx are arranged along a vertical direction in FIG. 10, and are formed by connecting the plurality of touch sensing electrodes to one another. The plurality of touch driving electrode array Tx are arranged along a horizontal direction in FIG. 10. The connection portion connecting the touch sensing electrodes is not shown in FIG. 10, which is provided to show the plurality of touch driving electrode arrays Tx, but shown in FIG. 11. The touch sensing electrode array Rx and the touch driving electrode array Tx are formed to be divided without overlapping portion on one plane.

Then, as shown in FIG. 11, the plurality of touch sensing electrode arrays Rx and the plurality of touch driving electrode arrays Tx are formed with electrodes of mesh shape.

That is, the plurality of touch sensing electrode arrays Rx are formed by connecting the plurality of touch sensing electrodes through the bridge, each touch sensing electrode is formed in mesh shape, and the plurality of touch driving electrode arrays Tx are formed in mesh shape without bridge.

For example, a metal for touch electrode is formed on the entire surface of the substrate then wet-etched to form a pattern in desired shape, and then the mesh-shaped metals are cut to divide the plurality of touch sensing electrodes and touch driving electrode arrays. Then, the touch sensing electrodes are connected through the ITO bridge, and thus the touch sensing electrode array and the touch driving electrode array can be formed.

The metal for touch electrode is formed of a material selected from metal materials such as Al, AlNd, Mo, MoTi, Cu, Cr, Ag and Ag series alloys, and thus resistance can be reduced because of high conductivity of metal.

Moreover, by forming the touch electrode in mesh shape, capacitance can be reduced, and finally, because of low RC delay, touch sensing time can be reduced.

In this description, the processes of the color filter substrate for the touch screen-integrated display device are mainly explained, but the spirit of the present invention is not limited thereto, and after fabricating the TFT substrate, the color filter substrate and the TFT substrate are attached with the liquid crystal layer therebetween and thus the touch screen-integrated display device can be fabricated.

In the embodiment of the present invention as above, by using the metal of excellent conductivity as a material of the touch electrode, time constant is reduced due to low resistance, and thus a large-sized touch screen-integrated display device can be fabricated.

Moreover, the touch electrode is shielded by the black matrix, and thus visibility can be increased.

Moreover, the touch electrode is shielded by the black matrix, and high transmittance and brightness can be obtained.

Moreover, the touch electrode is formed at the color filter substrate, and thus technical level of difficulty of production can be lowered.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A color filter substrate for a display device integrated with a touch screen, the color filter substrate comprising:
a plurality of touch sensing electrodes and a plurality of touch driving electrode arrays on a substrate;
a first protection layer on the plurality of touch sensing electrodes, the plurality of touch driving electrode arrays and the substrate;
a bridge formed on the first protection layer and connecting the plurality of touch sensing electrodes to one another;
a second protection layer on the first protection layer and the bridge;
a black matrix on the second protection layer;
a color filter layer on the second protection layer and the black matrix; and
a third protection layer on the color filter layer,
wherein the plurality of touch sensing electrodes include a first mesh pattern formed by crossing of first metal lines, and the plurality of touch driving electrode arrays include a plurality of second mesh patterns formed by crossing of second metal lines,
wherein the black matrix is formed at regions corresponding to the first and second metal lines, and
wherein a line width of the black matrix is equal to or greater than each of the metal lines forming the first and second mesh patterns.

2. The color filter substrate according to claim 1, wherein the first protection layer includes a contact hole exposing one of the first metal lines forming the touch sensing electrode, and the bridge is connected to the touch sensing electrode through the contact hole.

3. The color filter substrate according to claim 1, wherein the third protection layer is a photo acryl layer or overcoat layer.

4. The color filter substrate according to claim 1, wherein the first and second metal lines are selected out of metal materials including Al, AlNd, Mo, MoTi, Cu, Cr, Ag and Ag series alloys.

5. A method of fabricating a color filter substrate for a display device integrated with a touch screen, the method comprising:
forming a plurality of touch sensing electrodes and a plurality of touch driving electrode arrays on a substrate;
forming a first protection layer on the plurality of touch sensing electrodes, the plurality of touch driving electrode arrays and the substrate;
forming a bridge that is on the first protection layer and connects the plurality of touch sensing electrodes to one another;
forming a second protection layer on the first protection layer and the bridge;
forming a black matrix on the second protection layer;
forming a color filter layer on the second protection layer and the black matrix; and
forming a third protection layer on the color filter layer,
wherein the plurality of touch sensing electrodes include a first mesh pattern formed by crossing of first metal lines, and the plurality of touch driving electrode arrays include a plurality of second mesh patterns formed by crossing of second metal lines,
wherein the black matrix is formed at regions corresponding to the first and second metal lines, and
wherein a line width of the black matrix is equal to or greater than each of the metal lines forming the first and second mesh patterns.

6. The method according to claim 5, wherein the first protection layer includes a contact hole exposing one of the first metal lines forming the touch sensing electrode, and the bridge is connected to the touch sensing electrode through the contact hole.

7. The method according to claim 5, wherein the third protection layer is a photo acryl layer or overcoat layer.

8. The method according to claim 5, wherein the first and second metal lines are selected out of metal materials including Al, AlNd, Mo, MoTi, Cu, Cr, Ag and Ag series alloys.

* * * * *